United States Patent
Foerster et al.

(10) Patent No.: US 10,050,793 B2
(45) Date of Patent: Aug. 14, 2018

(54) REDUCTION OF MEMORY REQUIREMENT FOR CRYPTOGRAPHIC KEYS

(71) Applicant: Robert Bosch GmbH, Stuttgart (DE)

(72) Inventors: David Foerster, Ditzingen (DE); Jan Zibuschka, Eichenzell (DE); Jamshid Shokrollahi, Ludwigsburg (DE); Hans Loehr, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 229 days.

(21) Appl. No.: 14/737,794

(22) Filed: Jun. 12, 2015

(65) Prior Publication Data

US 2015/0381372 A1 Dec. 31, 2015

(30) Foreign Application Priority Data

Jun. 27, 2014 (DE) .................. 10 2014 212 443

(51) Int. Cl.
| | |
|---|---|
| *H04L 9/32* | (2006.01) |
| *H04L 9/08* | (2006.01) |
| *H04L 9/30* | (2006.01) |
| *H04L 29/06* | (2006.01) |

(52) U.S. Cl.
CPC .......... *H04L 9/3263* (2013.01); *H04L 9/0894* (2013.01); *H04L 9/3066* (2013.01); *H04L 63/0442* (2013.01); *H04L 63/0823* (2013.01); *H04L 63/126* (2013.01)

(58) Field of Classification Search
CPC ... H04L 9/3263; H04L 9/0894; H04L 9/3066; H04L 63/0442; H04L 63/126; H04L 63/0823
See application file for complete search history.

(56) References Cited

U.S. PATENT DOCUMENTS

| | | | |
|---|---|---|---|
| 6,675,296 B1 * | 1/2004 | Boeyen ................. | H04L 9/3263 713/156 |
| 6,914,985 B1 * | 7/2005 | Shrader ............... | G06F 21/6209 380/29 |
| 7,404,077 B1 * | 7/2008 | Peters ..................... | H04L 9/302 380/30 |
| 2002/0144109 A1 * | 10/2002 | Benantar ............... | H04L 63/062 713/156 |
| 2005/0166051 A1 * | 7/2005 | Buer ..................... | H04L 9/3263 713/173 |
| 2005/0283826 A1 * | 12/2005 | Tahan ................... | G06F 21/606 726/2 |

(Continued)

*Primary Examiner* — Kenneth W Chang
(74) *Attorney, Agent, or Firm* — Norton Rose Fulbright US LLP; Gerard Messina

(57) ABSTRACT

For communication of a first participant with at least one additional participant in a communication system via multiple protocols, the protocols using at least two different certificate formats, the first participant uses different certificates with the respective certificate formats for the communication via the different protocols, the different certificates being based on a shared public key. The first participant holds a shared associated private key for the different certificates. Provision of the certificates for the first participant includes generating the public key and the associated private key, signing the public key for provision of the first certificate, and signing the public key for provision of the second certificate.

22 Claims, 2 Drawing Sheets

(56) References Cited

U.S. PATENT DOCUMENTS

| | | | | |
|---|---|---|---|---|
| 2006/0095771 A1* | 5/2006 | Appenzeller | ............ | H04L 9/006 713/171 |
| 2006/0206707 A1* | 9/2006 | Kostal | .................... | G06F 21/33 713/156 |
| 2009/0208003 A1* | 8/2009 | Matsukawa | ............. | H04L 9/083 380/44 |
| 2009/0210703 A1* | 8/2009 | Epstein | ................... | H04L 9/006 713/157 |
| 2010/0275012 A1* | 10/2010 | Kido | ................... | H04L 63/0823 713/156 |
| 2011/0126002 A1* | 5/2011 | Fu | ....................... | H04L 63/0823 713/156 |
| 2011/0145585 A1* | 6/2011 | Campagna | ............ | H04L 9/3066 713/176 |
| 2011/0191578 A1* | 8/2011 | Hayes | ................. | H04L 63/0823 713/155 |
| 2012/0150960 A1* | 6/2012 | Nalawade | .............. | G06Q 30/02 709/204 |
| 2014/0317401 A1* | 10/2014 | Lee | ....................... | H04L 9/3268 713/156 |

\* cited by examiner

REDUCTION OF MEMORY REQUIREMENT FOR CRYPTOGRAPHIC KEYS

FIELD OF THE INVENTION

The present invention relates to a method for providing certificates to a participant in a communication system for communicating via multiple protocols as well as to a method for the communication by a participant using multiple protocols.

BACKGROUND

The increasing connection of services and devices in communication networks increases the requirements on secure communication. In this situation, secrecy and authenticity are usually ensured via asymmetric ("public key") encryption methods. Each participant in the communication network has a public key which is provided to communication partners, i.e., other participants in the communication network, and a private key, which is kept secret by the participant. The public key is signed by a central certification authority in order to confirm the authorization of the participant for the communication network. The signed, public key is referred to herein as a certificate. A certificate can in addition include, besides the public key, attributes (for example, the name or characteristics of the owner), which are also signed. Since the security of the communication system is based on the secrecy of the private key, the private key is usually stored on a Hardware Security Module (HSM).

Many communication networks store personal pieces of information of the participant and also pass them on. This information may be the exact location or other sensitive data. Known examples are personal assistance systems, Car2Car or Car2X systems and Internet of Things and Services (IoTS) in general. The traditional procedure in order to protect the privacy of the participant during the communication is the so-called pseudonymous communication. In this setup, each user uses a larger number of certificates (pseudonyms) and corresponding private keys, which are switched regularly, instead of a fixed pair of a certificate and an associated private key.

Due to their different requirements and conditions, some services use specific protocols and special formats in order to store the certificates and private keys. Such a protocol-specific certificate format is, for example, ETSI TS 103 097 in Car2Car communication. A conversion of a certificate having a public key in a certain format into a certificate having the same public key in a different format is not possible. Therefore, certificates cannot be used via multiple protocols which use different certificate formats.

The pseudonymous communication in itself already requires a large number of certificates and associated private keys, which must be stored. If different protocols must also be served, the number increases even more if the certificate formats are not compatible. In particular, this high number of private keys, which are stored in a secure memory, for example, in an HSM, thereby increases the costs for such a secure memory.

It is therefore desirable to enable a secure communication in a communication network via multiple protocols with a low need for secure memory.

SUMMARY

A first method according to an example embodiment of the present invention is used for the communication of a participant with at least one additional participant in a communication system via multiple protocols which use at least two certificate formats which differ from each other. For the communication via protocols having different certificate formats, the participant uses different certificates in the respective certificate format. The different certificates are based on a shared, public key. The participant holds ready a shared associated private key for the different certificates.

In this way, the same private key can be used for each of these certificates, for example, for decrypting or signing messages. Separate private keys for the certificates having different certificate formats are no longer necessary. In this way, a secure memory required for the private keys can be significantly reduced. For example, in the case of two different certificate formats, the required memory space for private keys is already reduced by half.

Preferably, the participant communicates with different additional participants using protocols which each use different certificate formats. In this way, the participant can also communicate with different additional participants who, for example, due to different security requirements or other requirements, are dependent on certain protocols.

A second method according to the present invention is used for providing certificates for a participant in a communication system in order to enable a communication via multiple protocols which use at least two certificate formats which differ from each other. In the process, a public key and an associated private key are initially generated. Furthermore, for providing a first certificate, the public key is signed, i.e., the first certificate is issued. Subsequently, one or multiple second certificate(s) is/are generated, i.e., supplied, in one or multiple second certificate format(s), which differ(s) from the first, for which purpose the public key is signed in each case. This means that the one or multiple second certificate(s) is/are based on the same public key.

In this way, certificates in different certificate formats, which can be used for communicating via different protocols, but which are at the same time based on the same key, are available to the participant. Therefore, the same private key can be used for each of these certificates, for example, for decrypting or for signing messages. Separate private keys for the certificates whose certificate formats differ are no longer necessary. In this way, a secure memory required for the private keys can be significantly reduced. For example, in the case of two different certificate formats, the required memory space for private keys is already reduced by half.

A method according to the present invention can be used not only for a public and an associated private key, but also for a plurality of public and associated private keys, in particular when using the pseudonymous communication mentioned at the outset. The higher the thus generated number of certificates is, the more noticeable is the memory space savings.

Preferably, the public key is signed by a certification authority or by different certification authorities, in particular after request by the participant. Depending on the required security degree, which may also be dependent on the used protocols and the communication partners to be communicated using them, the security can be increased further by using different certification authorities.

Preferably, the participant authorizes itself with the aid of the first certificate, received from the certification authority, to the same or a different certification authority for the provision of the one or the multiple second certificate(s) which are thus present in a certificate format which differs from the received certificate. The participant proves to the issuer, i.e., to the respective certification authority, its authority for receiving the one or the multiple second certificate(s) using the first certificate. This includes the proof of ownership of the associated private key, for example using a corresponding signature. Furthermore, the authorization can be carried out using attributes of the original certificate. The attributes of the one or the multiple second certificate(s) can also be proven as a function of the attributes of the second certificate, for example with the same values. Since it is not always known from the beginning in which certificate formats certificates are needed, certificates in additional certificate formats can be issued later as needed.

A combination of the two methods according to the present invention is particularly advantageous, i.e., a participant is provided with certificates having different certificate formats for multiple protocols and one shared private key, and the participant communicates with the aid of these certificates with at least one additional participant in the communication system.

Advantageously, the private key is stored by the participant in a secure memory. In this way, the access times on the private key are kept brief for the participant, since the private keys are stored there in an unencrypted form.

Alternatively, the private key is saved by the participant in an encrypted form, in particular in a non-secure memory, and is loaded into a secure memory and decrypted there as needed. In this case, both the requirement on secure memory as well as the number of loading and decryption processes can be reduced, since a lower number of private keys must be present in the secure memory simultaneously.

It is advantageous when the public key and the associated private key are generated with the aid of a cryptographic method which is used in each of the multiple protocols. In this way it can be ensured that the certificates are usable flawlessly in the respective certificate format for the corresponding protocol.

Preferably, the cryptographic method is based on elliptic curves, for example on NIST P256. In this way, a large number of public and associated private keys can be generated particularly efficiently. However, other cryptographic methods, for example, RSA, can also be used.

The use of a method according to the present invention is advantageous when the multiple protocols include at least one of the following protocols: ETSI ITS-G5 (or Direct Short-Range Communication, in Europe with messages using ETSI EN 302 665 and ETSI TS 103 097), DSRC (in North America with messages using IEEE 1609.2), HTTPS, TLS, DTLS, IPSec and a protocol specific for IoTS, in particular, AllJoyn. For example, ETSI ITS-G5 (in Europe) or DSRC (in North America) are used in the Car2X communication for the communication of vehicles with each other, and the protocol HTTPS (or IPSec) is used for the communication of vehicles with service providers. ETSI TS 103 097 in this case specifies a certificate format of its own for Car2X communication, while HTTPS uses the conventional X.509 format. In the Internet of Things and Services (IoTS), for example, both IoTS specific protocols such as AllJoyn as well as IPSec are used.

In an example embodiment, a processor unit according to the present invention, for example, a communication unit in a motor vehicle is, in particular, programmed to carry out a method according to the present invention.

The implementation of the method in the form of software is also advantageous, since it entails very low costs, in particular when an executing control unit is also used for other tasks and is therefore present anyway. Suitable data media for providing the computer program are, in particular, diskettes, hard drives, flash memories, EEPROMs, CD-ROMs, DVDs, etc. A download of a program via computer networks (Internet, Intranet, etc.) is also possible.

Additional advantages and embodiments of the present invention arise from the description and the accompanying drawings. It is understood that the features stated above and the features still to be explained below are usable not only in the particular combination specified but also in other combinations or alone without departing from the scope of the present invention.

The present invention is depicted schematically in the drawings based on an example embodiment and is described in greater detail below with reference to the drawings.

DETAILED DESCRIPTION

Figure 1:
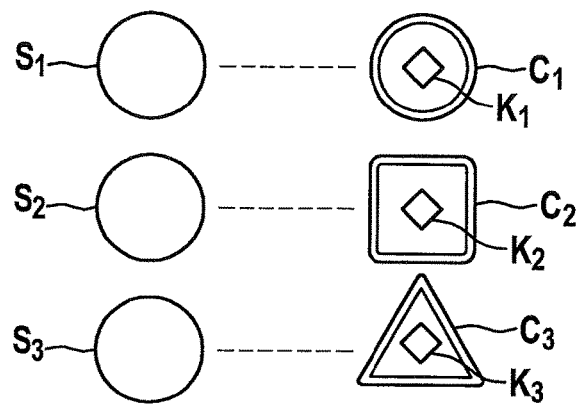
FIG. 1 schematically shows a relationship between key pairs and certificates according to the related art.

FIG. 1 schematically shows a relationship between key pairs and certificates as known from the related art. During the generation of the certificates, a key pair is initially generated for each certificate. For example, a public key K1 and an associated private S1 are initially generated for certificate C1. The generation of keys K1 and S1 can be generated with the aid of a cryptographic method based on elliptic curves, the so-called Elliptic Curve Cryptography.

From public key K1, certificate C1 is subsequently generated by signing public key K1. The signing is usually carried out by a certification authority. Certificate C1 is thereby generated in a certain certificate format, which is illustrated by the circular symbol of certificate C1.

Additional certificates C2 and C3, each in turn in certain certificate formats, which, however, differ from each other and from certificate C1, are generated in the same manner as certificate C1. The different certificate formats are illustrated here by the square symbol of certificate C2 and the triangular symbol of certificate C3. For this purpose, key pairs K2, S2, or K3, S3 are initially generated, whereupon the public keys K2 or K3 are each signed by a certification authority.

Figure 2:
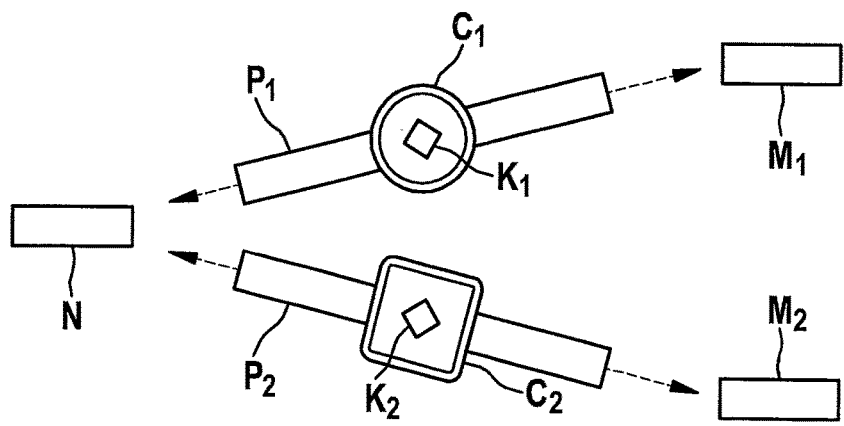
FIG. 2 schematically shows a communication in a communication network via different protocols according to the related art.

FIG. 2 schematically shows a communication of a participant N with two additional participants M1 and M2 in a communication network. The participant N can, for example, be a vehicle or a communication unit in a vehicle. Additional participants M1 and M2 can be, for example, another vehicle and a traffic infrastructure station or a service provider. Participant N is in possession of certificates C1 and C2, which have been generated according to the method shown in FIG. 1 and described above.

Certificates C1 and C2 have different certificate formats, as mentioned above. These different certificate formats are necessary in order to be able to communicate via different protocols P1 and P2. For example, protocol P1 can be an ETSI ITS-G5 protocol, which is designed specifically for the communication with other vehicles, and thus with additional participant M1. For this purpose, certificate C1 has a certificate format, which is specified in ETSI TS 103 097, which is specifically necessary for the communication via ETSI ITS-G5 protocols.

Protocol P2, by contrast, can be, for example, an HTTPS protocol via which participant N can communicate with traffic infrastructure, and thus with participant M2. Certificate C2 has, for example, a conventional X.509 certificate format.

For the communication, participant N now requires the corresponding private key S1 or S2 for each of certificates C1 and C2, as described with reference to FIG. 1. Since generally, however, a plurality of certificates (pseudonyms) is provided for each protocol in order to ensure a certain anonymity, a corresponding plurality of private keys must also be present, which are stored in a secure memory.

Figure 3:
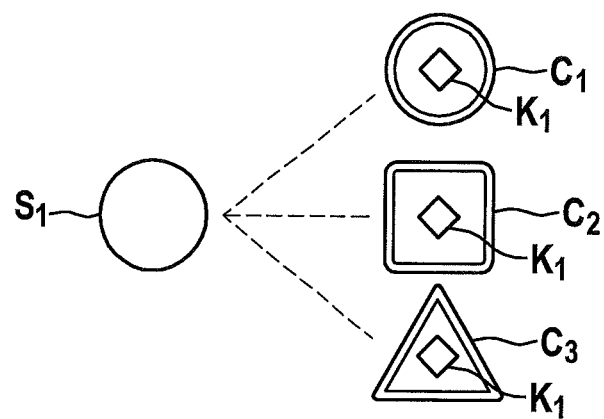
FIG. 3 schematically shows a relationship between key pairs and certificates in a method of an example embodiment of the present invention.

FIG. 3 schematically shows a relationship between key pairs and certificates according to a method of an example embodiment of the present invention. During the generation of the certificates, a key pair is initially generated, namely a public key K1 and an associated private key S1. The generation of keys K1 and S1 can be generated with the aid of a cryptographic method based on elliptic curves, the so-called Elliptic Curve Cryptography, as also known from the related art.

By signing public key K1, first certificate C1 is initially generated in a first certificate format from public key K1. The signing is carried out by a certification authority, for example. First certificate C1 is transmitted to participant N after the generation.

Subsequently, participant N uses first certificate C1 in order to authorize itself to the certification authority, i.e., in order to prove that it possesses private key S1 belonging to public key K1. Subsequently, the two second certificates C2 and C3 are issued by the certification authority, each in certificate formats differing from each other and from the first certificate format, by signing public key K1 correspondingly for the respective certificate format. In this way, certificates C1, C2 and C3 have different certificate formats, as illustrated by the different symbols. The certificate formats are the same here as already shown in FIG. 1.

The signing is carried out by, for example, a certification authority for the certificates in all certificate formats. However, it is also conceivable to use different certification authorities for different certificate formats. In this way, a higher security can be ensured.

Private key S1 associated with public key K1 can now be used for each of certificates C1, C2 and C3. In contrast to the related art and the method described with reference to FIG. 1, different private keys for certificates in different certificate formats are no longer necessary.

Figure 4:
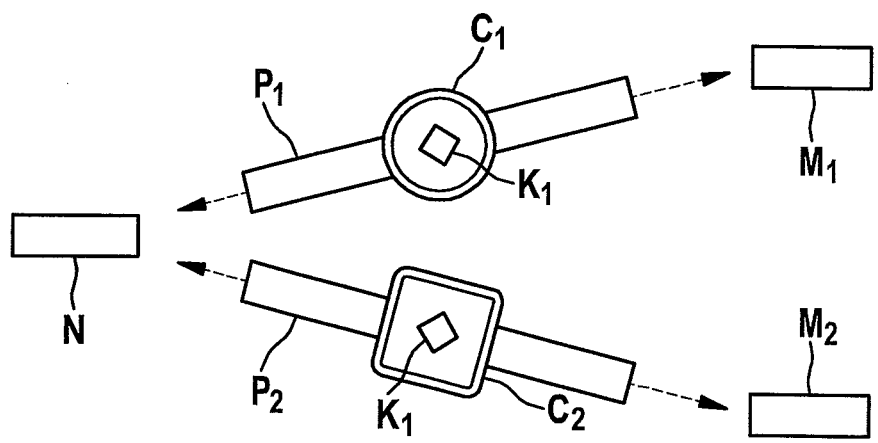
FIG. 4 schematically shows a communication in a communication network via different protocols according to a method of an example embodiment of the present invention.

FIG. 4 schematically shows a communication of a participant N with two additional participants M1 and M2 in a communication network according to a method of an example embodiment of the present invention. The communication of participant N with the additional participants M1 and M2 is carried out similarly to the way described for the related art with reference to FIG. 2.

The two different protocols P1 and P2 use the same cryptographic method, for example the cryptographic method mentioned above based on elliptic curves. However, other cryptographic methods, which are used by both protocols, are also conceivable.

A decisive difference from the related art is that certificates C1 and C2, which still have different certificate formats, are no longer based on different public keys, but are rather both based on the same public key K1. As already described with reference to FIG. 3, only private key S1 is still required, which can be used for the certificates in all certificate formats.

For the communication, participant N now requires for the two certificates C1 and C2 together only private key S1. For the generally large number of certificates (pseudonyms), the number of the private keys to be stored in the secure memory decreases compared to the related art. For example, the number of the private keys in the example shown in FIG. 4 having two certificate formats is already reduced by half.

What is claimed is:

1. A computer network communication method comprising:
   a first participant communicating over a network with a second participant using a first protocol and using a first certificate in a first certificate format;
   the first participant communicating over the network with the second participant or a third participant using a second protocol that is different than the first protocol and using a second certificate that is in a second certificate format different than the first certificate format,
   providing the first and second certificates by:
   generating a shared public key and a single private key;
   signing, by one of a first certification authority and a second certification authority, the shared public key for provision of the first certificate;
   signing, by the one of the first certification authority and the second certification authority, the shared public key for provision of the second certificate;
   wherein:
      the first and second certificates are generated separately from one another using the shared public key;
      a single private key of the first participant (N) is paired with both the first and second certificates for the communications using the first and second protocols; and
      the communications using the first and second protocols include processing circuitry performing an authentication based on the private key and the first and second certificates.

2. The method of claim 1, wherein the communication using the second protocol is between the first and third participants.

3. The method of claim 1, further comprising providing the first and second certificates by:
   generating the public key and the private key;
   signing the public key for provision of the first certificate; and
   signing the public key for provision of the second certificate.

4. The method of claim 1, wherein the private key is stored in a safe memory by the first participant.

5. The method of claim 1, wherein the private key is stored by the first participant in an encrypted form and loaded into a secure memory, and subsequently decrypted for pairing with the first and second certificates to authorize the communications.

6. The method of claim 1, wherein the public and private keys are generated using a cryptographic method, which is used for each of the first and second protocols.

7. The method of claim 6, wherein the cryptographic method is based on elliptic curves or on a Rivest-Shamir-Adleman (RSA) encryption.

8. The method of claim 1, wherein the first and second protocols include at least one of the following protocols: ETSI ITS-G5, DSRC, HTTPS, TLS, DTLS, IPSec and a protocol specific for IoTS.

9. The method of claim 8, wherein the first and second protocols include AllJoyn.

10. A computer-implemented method for providing certificates for a participant in a communication system for communicating via multiple protocols which use at least two different respective certificate formats, comprising:
generating, by processing circuitry, a public key and an associated private key;
signing, by one of a first processing circuitry of a first certification authority and a second processing circuitry of a second certification authority, the public key for provision of a first certificate in a first certificate format; and
signing, by the one of the first processing circuitry of the first certification authority and the second processing circuitry of the second certification authority, the public key for provision of a second certificate in a second certificate format that is different than the first certificate format,
communicating over a network using a first protocol and the first certificate; and
communicating over the network using a second protocol and the second certificate;
wherein:
the first and second certificates are generated separately from one another using the public key, and
the private key of the participant is paired with both the first and second certificates for communications using the multiple protocols.

11. The method of claim 10, wherein the processing circuitry includes a first processing circuitry of a first certification authority performing the signing for the provision of the first certificate and a second processing circuitry of a second certification authority performing the signing for the provision of the second certificate.

12. The method of claim 10, wherein the participant authorizes itself using the first certificate, which the participant receives from a certification authority that includes at least a portion of the processing circuitry, the authorization being used for the provision of the second certificate.

13. The method of claim 10, wherein the private key is stored in a safe memory by the participant.

14. The method of claim 10, wherein the private key is stored by the participant in an encrypted form and loaded into a secure memory, and subsequently decrypted for pairing with the first and second certificates to authorize communications.

15. The method of claim 10, wherein the public and private keys are generated using a cryptographic method, which is used for each of the multiple protocols.

16. The method of claim 14, wherein the cryptographic method is based on elliptic curves or on a Rivest-Shamir-Adleman (RSA) encryption.

17. The method of claim 10, wherein the multiple protocols include at least one of the following protocols: ETSI ITS-G5, DSRC, HTTPS, TLS, DTLS, IPSec and a protocol specific for IoTS.

18. The method of claim 10, wherein the multiple protocols include AllJoyn.

19. A device comprising:
processing circuitry of a first participant, wherein:
the processing circuitry is configured to:
communicate over a network with a second participant using a first protocol and using a first certificate in a first certificate format; and
communicate over the network with the second participant or a third participant using a second protocol that is different than the first protocol and using a second certificate that is in a second certificate format different than the first certificate format;
provide the first and second certificates by:
generating a shared public key and a single private key;
signing, by one of a first certification authority and a second certification authority, the shared public key for provision of the first certificate;
signing by the one of the first certification authority and the second certification authority, the shared public key for provision of the second certificate;
wherein:
the first and second certificates are generated separately from one another using the shared public key;
a single private key of the first participant is paired with both the first and second certificates for the communications using the first and second protocols; and
the communications using the first and second protocols include processing circuitry performing an authentication based on the private key and the first and second certificates.

20. A non-transitory computer-readable medium on which are stored instructions that are executable by a processor of a first participant and that, when executed by the processor, cause the processor to perform a method, the method comprising:
communicating over a network with a second participant using a first protocol and using a first certificate in a first certificate format;
communicating over the network with the second participant or a third participant using a second protocol that is different than the first protocol and using a second certificate that is in a second certificate format different than the first certificate format;
providing the first and second certificates by:
generating a shared public key and a single private key;
signing, by one of a first certification authority and a second certification authority, the shared public key for provision of the first certificate;
signing, by the one of the first certification authority and the second certification authority, the shared public key for provision of the second certificate;
wherein:
the first and second certificates are generated separately from one another using the shared public key;
a single private key of the first participant is paired with both the first and second certificates for the communications using the first and second protocols; and
the communications using the first and second protocols include processing circuitry performing an authentication based on the private key and the first and second certificates.

21. A device comprising:
processing circuitry, wherein:
the processing circuitry is configured to provide certificates for a participant in a communication system for communicating via multiple protocols which use at least two different respective certificate formats; and the provision of the certificates includes:
generating a public key and an associated private key;
signing, by one of a first processing circuitry of a first certification authority and a second processing circuitry of a second certification authority, the public key for provision of a first certificate in a first certificate format; and
signing, by the one of the first processing circuitry of the first certification authority and the second processing circuitry of the second certification authority, the public key for provision of a second certificate in a second certificate format that is different than the first certificate format,
communicating over a network using a first protocol and the first certificate; and
communicating over the network using a second protocol and the second certificate, wherein:
the first and second certificates are generated separately from one another using the public key, and
the private key of the participant is paired with both the first and second certificates for communications using the multiple protocols.

22. A non-transitory computer-readable medium on which are stored instructions that are executable by a processor of a first participant and that, when executed by the processor, cause the processor to perform a method, the method comprising:

providing certificates for a participant in a communication system for communicating via multiple protocols which use at least two different respective certificate formats, wherein the provision of the certificates includes:
generating a public key and an associated private key;
signing, by one of a first certificate authority and a second certificate authority, the public key for provision of a first certificate in a first certificate format;
signing, by the one of the first certificate authority and the second certificate authority, the public key for provision of a second certificate in a second certificate format that is different than the first certificate format,
communicating over a network using a first protocol and the first certificate; and
communicating over the network using a second protocol and the second certificate, wherein:
the first and second certificates are generated separately from one another using the public key, and
the private key of the participant is paired with both the first and second certificates for communications using the multiple protocols.

* * * * *